United States Patent
Tankasala Veparala et al.

(10) Patent No.: US 12,039,434 B2
(45) Date of Patent: Jul. 16, 2024

(54) SYSTEM AND METHOD FOR OPERATION OPTIMIZATION OF AN EQUIPMENT

(71) Applicant: Tata Consultancy Services Limited, Mumbai (IN)

(72) Inventors: Vishnu Tankasala Veparala, Noida (IN); Solomon Pushparaj Manuelraj, Bangalore (IN); Ankit Bansal, Noida (IN); Pankaj Malhotra, Noida (IN); Lovekesh Vig, Gurgaon (IN); Gautam Shroff, Gurgaon (IN); Venkataramana Runkana, Pune (IN); Sivakumar Subramanian, Pune (IN); Aditya Pareek, Pune (IN); Vishnu Swaroopji Masampally, Pune (IN); Nishit Raj, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 720 days.

(21) Appl. No.: 17/309,432

(22) PCT Filed: Nov. 28, 2019

(86) PCT No.: PCT/IN2019/050871
§ 371 (c)(1),
(2) Date: May 26, 2021

(87) PCT Pub. No.: WO2020/110149
PCT Pub. Date: Jun. 4, 2020

(65) Prior Publication Data
US 2022/0036166 A1    Feb. 3, 2022

(30) Foreign Application Priority Data
Nov. 28, 2018   (IN) .............................. 201821044941

(51) Int. Cl.
*G06N 3/063*   (2023.01)
*G06N 3/10*    (2006.01)

(52) U.S. Cl.
CPC ............... *G06N 3/063* (2013.01); *G06N 3/10* (2013.01)

(58) Field of Classification Search
CPC .......... G06N 3/063; G06N 3/10; G06N 3/042; G06N 3/044; G06N 3/045; G06N 3/08; G06N 5/04; G06N 7/01; G06N 3/006
See application file for complete search history.

(56) References Cited

U.S. PATENT DOCUMENTS

| 5,377,307 A | 12/1994 | Hoskins et al. |
| 6,278,899 B1 | 8/2001 | Piche et al. |

(Continued)

FOREIGN PATENT DOCUMENTS

GB   2472683 A   2/2011

OTHER PUBLICATIONS

International Search Report and Written Opinion mailed May 21, 2020, in International Application No. PCT/IN2019/050871; 9 pages.

*Primary Examiner* — Pei Yong Weng
(74) *Attorney, Agent, or Firm* — FINNEGAN, HENDERSON, FARABOW, GARRETT & DUNNER LLP

(57) ABSTRACT

This disclosure relates to optimizing an operation of an equipment by a neural network based optimizer is provided. The method include receiving, information associated with at least one equipment instance (j) as an input at a predefined sequence of timestamps; training, a plurality of simulation models for each equipment instance to obtain a function ($f_j$); processing, the external input parameters ($e_t$) to obtain a fixed-dimensional vector and passed as an input to obtain an (Continued)

vector ($i_t$); generating, a modified ($i_t$) from the output vector ($i_t$) based on a domain constraint value; computing, a reward ($r_t$) based on (i) the function ($f_j$), (ii) the modified ($i_t$), (iii) the external input parameters ($e_t$), and (iv) a reward function ($R_j$); and iteratively performing the steps of processing, generating, and computing reward ($r_t$) for a series of subsequent equipment instances after expiry of the predefined sequence of timestamps associated with a first equipment instance.

18 Claims, 11 Drawing Sheets

(56) References Cited

U.S. PATENT DOCUMENTS

| | | |
|---|---|---|
| 6,490,572 B2 | 12/2002 | Akkiraju et al. |
| 7,050,873 B1 | 5/2006 | Discenzo |
| 8,055,358 B2 | 11/2011 | Blevins et al. |
| 2006/0074501 A1* | 4/2006 | Hartman ............... G06N 3/02 700/29 |
| 2009/0113049 A1 | 4/2009 | Nasle et al. |
| 2014/0358831 A1* | 12/2014 | Adams ............... G06N 7/01 706/20 |
| 2015/0309486 A1 | 10/2015 | Webersinke et al. |
| 2016/0018795 A1 | 1/2016 | Sayyar-Rodsari et al. |
| 2018/0024509 A1* | 1/2018 | Piche ............... G06N 3/044 706/12 |

\* cited by examiner

| Mode | Reward (Higher is better) | Number of Trials (lower is better) |
|---|---|---|
| Machine Learning + Domain based | 8.4 | 36 |
| Automated Neural Network based Optimizer | 16.4 | 33 |

FIG. 8

SYSTEM AND METHOD FOR OPERATION OPTIMIZATION OF AN EQUIPMENT

PRIORITY CLAIM

The present application is a U.S. National Stage Filing under 35 U.S.C. § 371 and claims priority from International Application No. PCT/IN2019/050871 filed on Nov. 28, 2019, which application claims priority under 35 U.S.C. § 119 from India Application No. 201821044941, filed on Nov. 28, 2018. The entire contents of the aforementioned applications are incorporated herein by reference.

TECHNICAL FIELD

This disclosure relates generally to operation optimization, and, more particularly, to system and method for operation optimization of an equipment by a neural network based optimizer.

BACKGROUND

Several practical optimization problems for complex dynamical systems pose a unique challenge owing to the restriction on the number of possible function evaluations. The optimization functions do not have a simple closed form but can be evaluated (queried) at any arbitrary query point on the domain. However, evaluation of real world complex processes is expensive and time consuming and has to be optimized while employing as real world function evaluations. Most practical optimization problems are constrained in nature, i.e., have one or more constraints on values of input parameters. At present scenario, finding one or more control input parameters for an equipment's (e.g., boiler operations in a power plant) optimal operational efficiency is difficult.

Human trials are conducted to obtain the optimal input parameters. These experimental trials are costly to conduct, time consuming, and require costly domain experts and manual resources. Highly non-linear and dynamic nature of complex equipment (such as in the power plant) makes $i_t$ difficult to find optimal control input parameters especially given the lack of good simulation models for the complex operations. This makes current machine learning (ML) and optimization techniques ineffective. Also, in case of a completely new equipment type, lack of any historical data of trials makes $i_t$ hard to build simulation models which are required to obtain optimal input parameters. In another scenario, the equipment at hand might be similar to other equipments whose historical data is available. In such cases, an optimizer trained on the similar set of equipment to the new equipment needs to be directly used for optimizing for the new equipment.

SUMMARY

Embodiments of the present disclosure present technological improvements as solutions to one or more of the above-mentioned technical problems recognized by the inventors in conventional systems. For example, in one aspect, a processor implemented method of optimizing an operation of an equipment by a neural network based optimizer is provided. The processor implemented method includes at least one of: receiving, information associated with at least one equipment instance (j) as an input at a predefined sequence of timestamps; training, by a simulation model trainer, a plurality of simulation models for each equipment instance using the information associated with the at least one equipment instance (j) to obtain a function ($f_j$); generating, by a sequence generator, at least one sequence of the external input parameters ($e_t$); processing, by a multi-head input handler, the external input parameters ($e_t$) to obtain a fixed-dimensional vector that is passed as an input to a neural network to obtain an output vector ($i_t$); generating, by a domain constraints handler, a modified ($i_t$) from the vector ($i_t$) based on a domain constraint value; computing, by a multi-head output handler, a reward ($r_t$) based on (i) the function ($f_j$), (ii) the modified ($i_t$), (iii) the external input parameters ($e_t$), and (iv) a reward function ($R_j$); and iteratively performing the steps of processing, generating, and computing reward ($r_t$) for a series of subsequent equipment instances after expiry of the predefined sequence of timestamps associated with a first equipment instance. In an embodiment, the information associated with the at least one equipment instance (j) corresponds to at least one of (i) a plurality of control parameters ($i_t$), (ii) external input parameters ($e_t$), (iii) output parameters ($o_t$), and (iv) historical operational data. In an embodiment, the function ($f_j$) corresponds to a set of simulation models of the equipment instance (j).

In an embodiment, the multi-head input handler may include a processing head for each equipment instance. In an embodiment, number of external input parameters may differ across different instances of equipments. In an embodiment, the function $f_j$ may be generated by at least one of (i) a Gaussian processes, or (ii) Gaussian mixture models constrained on dimensionality of the output vector $i_t$ and the vector of external input parameters $e_t$, and combination thereof. In an embodiment, one or more hardware processors may further configured to input, the vector ($i_t$) and reward ($r_t$) into the Neural Network with the vector of external input parameters at time ('t+1'), $e_{t+1}$ for iteratively perform the steps of process, generate, and compute reward to obtain the set of control input parameters at time (t+1), $i_{t+1}$. In an embodiment, dimensionality of $i_t$ and $e_t$ may be determined by a target domain. In an embodiment, the step of training the neural network with a loss function may be performed based on a maximum attainable value of the reward function ($R_j$). In an embodiment, the neural network may be trained by including an additional loss function using a plurality of penalty values for violating domain constraints.

In another aspect, there is provided a system for operation optimization of an equipment by a neural network based optimizer. The system comprises a memory storing instructions; one or more communication interfaces; and one or more hardware processors coupled to the memory via the one or more communication interfaces, wherein the one or more hardware processors are configured by the instructions to: receive, information associated with at least one equipment instance (j) as an input at a predefined sequence of timestamps; train, a plurality of simulation models for each equipment instance using the information associated with the at least one equipment instance (j) to obtain a function ($f_j$); generate, at least one sequence of the external input parameters ($e_t$); process, the external input parameters ($e_t$) to obtain a fixed-dimensional vector that is passed as an input to a neural network to obtain an vector ($i_t$); generate, a modified ($i_t$) from the vector ($i_t$) based on a domain constraint value; compute, a reward ($r_t$) based on (i) the function ($f_j$), (ii) the modified ($i_t$), (iii) the external input parameters ($e_t$), and (iv) a reward function ($R_j$); and iteratively perform the steps of processing, generating, and computing reward ($r_t$) for a series of subsequent equipment instances after expiry of the predefined sequence of timestamps associated with a first equipment instance. In an embodiment, the information associated with the at least one equipment instance (j) corresponds to at least one of (i) a plurality of control parameters ($i_t$), (ii) external input parameters ($e_t$), (iii) output parameters ($o_t$), and (iv) historical operational data. In an embodiment, the function ($f_j$) corresponds to a set of simulation models of the equipment instance (j).

In an embodiment, the multi-head input handler may include a processing head for each equipment instance. In an embodiment, number of external input parameters may differ across different instances of equipments. In an embodiment, the function $f_j$ may be generated by at least one of (i) a Gaussian processes, or (ii) Gaussian mixture models constrained on dimensionality of the output vector $i_t$ and the vector of external input parameters $e_t$, and combination thereof. In an embodiment, one or more hardware processors may further configured to input, the output vector ($i_t$) and reward ($r_t$) into the Neural Network with the vector of external input parameters at time ('t+1'), $e_{t+1}$ for iteratively perform the steps of process, generate, and compute reward to obtain the set of control input parameters at time (t+1), $i_{t+1}$. In an embodiment, dimensionality of $i_t$ and $e_t$ may be determined by a target domain. In an embodiment, the step of training the neural network with a loss function may be performed based on a maximum attainable value of the reward function ($R_j$). In an embodiment, the neural network may be trained by including an additional loss function using a plurality of penalty values for violating domain constraints.

In yet another aspect, there are provided one or more non-transitory machine readable information storage mediums comprising one or more instructions which when executed by one or more hardware processors causes at least one of: receiving, information associated with at least one equipment instance (j) as an input at a predefined sequence of timestamps; training, a plurality of simulation models for each equipment instance using the information associated with the at least one equipment instance (j) to obtain a function ($f_j$); generating, at least one sequence of the external input parameters ($e_t$); processing, the external input parameters ($e_t$) to obtain a fixed-dimensional vector that is passed as an input to a neural network to obtain an output vector ($i_t$); generating, a modified ($i_t$) from the vector ($i_t$) based on a domain constraint value; computing, a reward ($r_t$) based on (i) the function ($f_j$), (ii) the modified ($i_t$), (iii) the external input parameters ($e_t$), and (iv) a reward function ($R_j$); and iteratively performing the steps of processing, generating, and computing reward ($r_t$) for a series of subsequent equipment instances after expiry of the predefined sequence of timestamps associated with a first equipment instance. In an embodiment, the information associated with the at least one equipment instance (j) corresponds to at least one of (i) a plurality of control parameters ($i_t$), (ii) external input parameters ($e_t$), (iii) output parameters ($o_t$), and (iv) historical operational data. In an embodiment, the function ($f_j$) corresponds to a set of simulation models of the equipment instance (j).

In an embodiment, the multi-head input handler may include a processing head for each equipment instance. In an embodiment, number of external input parameters may differ across different instances of equipments. In an embodiment, the function $f_j$ may be generated by at least one of (i) a Gaussian processes, or (ii) Gaussian mixture models constrained on dimensionality of the output vector $i_t$ and the vector of external input parameters $e_t$, and combination thereof. In an embodiment, one or more hardware processors may further configured to input, the output vector ($i_t$) and reward ($r_t$) into the Neural Network with the vector of external input parameters at time ('t+1'), $e_{t+1}$ for iteratively perform the steps of process, generate, and compute reward to obtain the set of control input parameters at time (t+1), $i_{t+1}$. In an embodiment, dimensionality of $i_t$ and $e_t$ may be determined by a target domain. In an embodiment, the step of training the neural network with a loss function may be performed based on a maximum attainable value of the reward function ($R_1$). In an embodiment, the neural network may be trained by including an additional loss function using a plurality of penalty values for violating domain constraints.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8 is an exemplary table view with summary results of an operation optimization system for the equipment by using the neural network based optimizer according to embodiments of the present disclosure.

DETAILED DESCRIPTION

Figure 1:
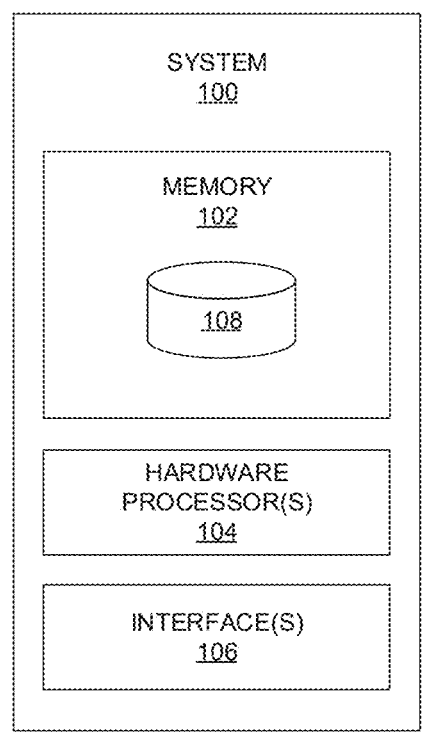
FIG. 1 illustrates a block diagram of an operation optimization system for an equipment by using a neural network based optimizer according to embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 illustrates a block diagram of the operation optimization system 100 for a process and an equipment by using the neural network based optimizer according to embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, a plurality of parameters obtained from one or more sensors, wherein the parameters are specific to an entity (e.g., user, machine, equipment, and the like). In an embodiment, the equipment can be industrial boilers, engines, health care devices, chemical reactions/processes etc. Parameters may comprise sensor data captured through the sensors either connected to the user and/or machine. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2A:
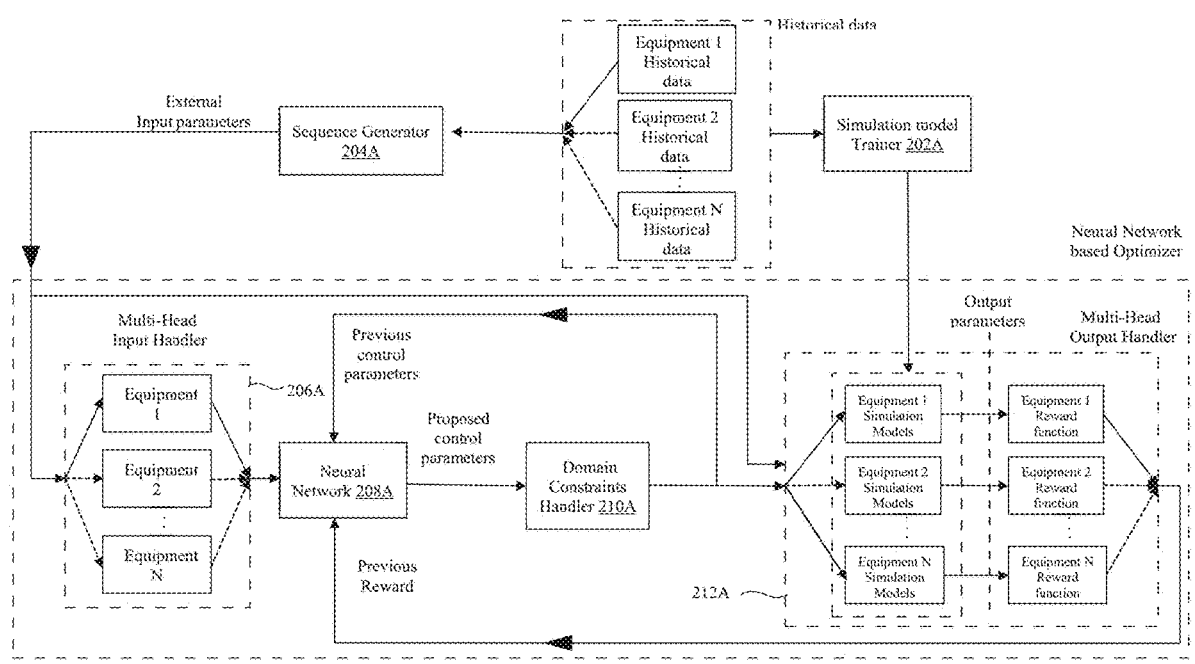
FIG. 2A and FIG. 2B is an exemplary block diagram of an operation optimization system for the equipment by using the neural network based optimizer according to embodiments of the present disclosure.
Figure 2B:
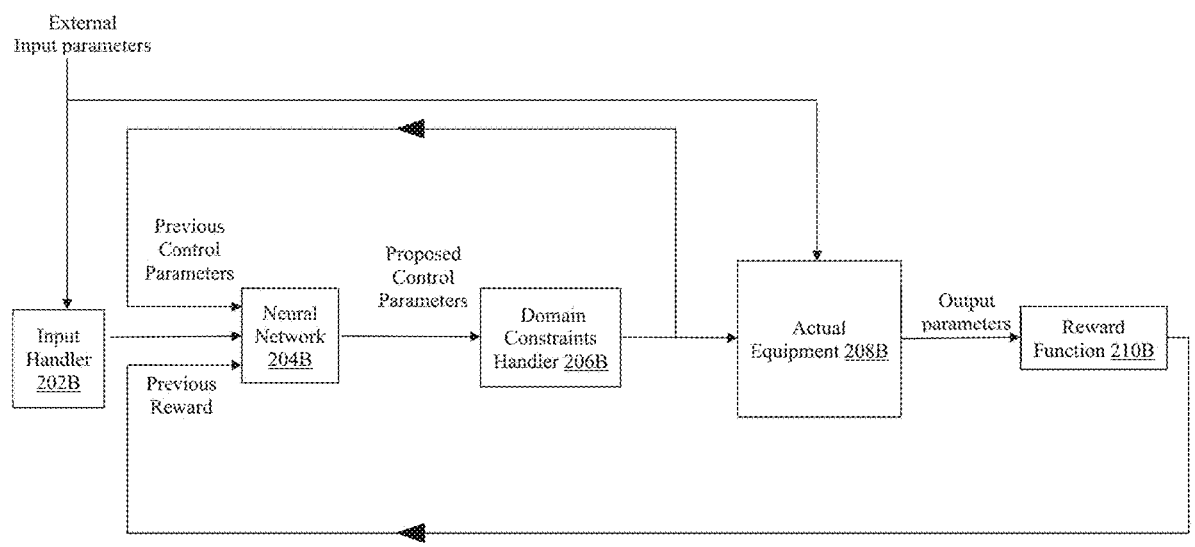

FIGS. 2A and 2B is an exemplary block diagram of the operation optimization system 200 for the equipment by using the neural network based optimizer according to embodiments of the present disclosure. With reference to FIG. 2A, the operation optimization system 200 comprises a simulation model trainer 202A, a sequence generator 204A, a multi-head input handler 206A, a neural network 208A, a domain constraints handler 210A, and a multi-head output handler 212A. In an embodiment, at any particular time during a training stage, information associated with one or more equipment instances (e.g., $j^{th}$) is received as an input. In an embodiment, the information associated with the at least one equipment instance (j) corresponds to at least one of (i) a plurality of control parameters ($i_t$), (ii) external input parameters ($e_t$), (iii) output parameters ($o_t$), and (iv) historical operational data. In an embodiment, for training the Neural Network based optimizer, a historical data from multiple instances of an equipment is used. For example, data of the $j^{th}$ equipment instance is chosen.

The information associated with the $j^{th}$ equipment instance is used to train a plurality of simulation models by the simulation model trainer 202A for each equipment instance to obtain a function ($f_j$). In an embodiment, the function ($f_j$) corresponds to a set of simulation models of the equipment instance (j). In an embodiment, for pre-training of the Neural Network based optimizer, a large number of functions ($f_j$) can be generated via Gaussian Processes or Gaussian Mixture models constrained on the dimensionality of $i_t$ and $e_t$, and combination thereof. For adapting the Neural Network based optimizer to domain at hand and fine-tuning of the Neural Network based optimizer to the domain, historical data from multiple instances of an equipment or a process can be used. For example, the data of the $j^{th}$ equipment instance is chosen.

For example, the neural network can be a recurrent neural network (RNN) such as Long Short Term Memory (LSTM) based neural network or a temporal convolutional neural network with causal connections. In an embodiment, during a training phase, a diverse set of differentiable non convex functions with known global optima are synthetically generated for training a RNN optimizer. The RNN optimizer predicts next query in order to explore search space provided sequences of previous queries and functionality responses.

Consider, $r_{opt}$ of $f_j$ given by $r_{opt}=f_j(i_{opt})$ is known for determining a regret $r_{opt}-\max_{i<t} r_i$ after 't' iterations (queries) to the functions $f_j$. For example. A regret based loss function are:

$$L_R = \sum_{f_j \in F} \sum_{k=2}^{T} \frac{1}{\gamma^t} ReLU(r_{opt} - \max_{i<t} r_i) \qquad (1)$$

where ReLU (x)=max(x,0). Since the regret is expected to be high during initial iterations because of random initialization of x but desired to be low close to T, by providing exponentially increasing importance to regret terms via discount factor $0<\gamma\leq 1$.

In an embodiment, dealing any range of values that $f_j$ can take during training or that $f_b$ can take during interference, incremental normalization is considered while training such that $r_t$ is replaced by $$\tilde{r}_t = \frac{r_t - \mu_t}{\sqrt{\sigma_t^2 + \epsilon}}$$

such that $h_{t+1}=f_o(h_t, i_t, \tilde{r}_t; \theta)$, where $$\mu_t = \frac{1}{t}\sum_{k=1}^{t} r_i, \sigma_t^2 = \frac{1}{t}\sum_{k=1}^{t} (r_i - \mu_t)^2, \text{ and } 0 < \epsilon \ll 1.$$

In an embodiment, the simulation models can be conditioned Gaussian Processes, regression models (e.g., as linear regression models), or deep regression models based on neural networks such as self-normalizing neural networks, long short term memory networks (LSTM), feed forward neural networks.

The sequence generator 204A is configured to generate one or more sequences of the external input parameters ($e_t$). In an embodiment, the external input parameters ($e_t$) can be sampled from the historical data of the equipment instance (j) at a predefined time instance. The multi-head input handler 206A is configured to process an external input parameter vector ($e_t$) to obtain a fixed dimensional vector which is inputted to the Neural Network 208A to obtain the control parameter $i_t$.

In an embodiment, the multi-head input handler 206A includes multiple processing heads, one per equipment instance because number of external input parameters can vary across different instances of equipment. In an embodiment, since the Neural Network's input dimension have to be fixed, the external input parameters ($e_t$) is reduced to a fixed dimensional vector before inputting to the Neural Network 208A. The processing head for the $j^{th}$ equipment instance is used. In an embodiment, the fixed dimensional output of the Multi-Head Input Handler 212A, $i_{t-1}$ and $r_{t-1}$ are input to the Neural Network 208A to obtain the control parameter $i_t$. The control parameter $i_t$ is passed through the domain constraints handler 210A. In an embodiment, if certain values in the obtained control parameter $i_t$ does not fall in prescribed ranges according to the domain, then the control parameter $i_t$ is properly modified before further processing to obtain modified $i_t$.

In an embodiment, after obtaining the control parameter $i_t$ a check according to pre-determined domain constraints is performed on the control parameter $i_t$. For example, if the control parameter $i_t$ violates domain constraints, then the control parameter $i_t$ is not passed through the simulation models (during training/fine-tuning) or a physical equipment (during testing). An additional input to the neural network based optimizer is included which denotes a penalty for out of domain values for the control parameter $i_t$ as mentioned subsequently in equation 2. Also, a loss function using the penalty values over time is additionally included in the training/fine-tuning procedure of the neural network based optimizer. Accordingly, the neural network based optimizer additionally tries to minimize the number of out of domain suggestions for the $i_t$ during testing as mentioned subsequently in equation 3.

Figure 3:
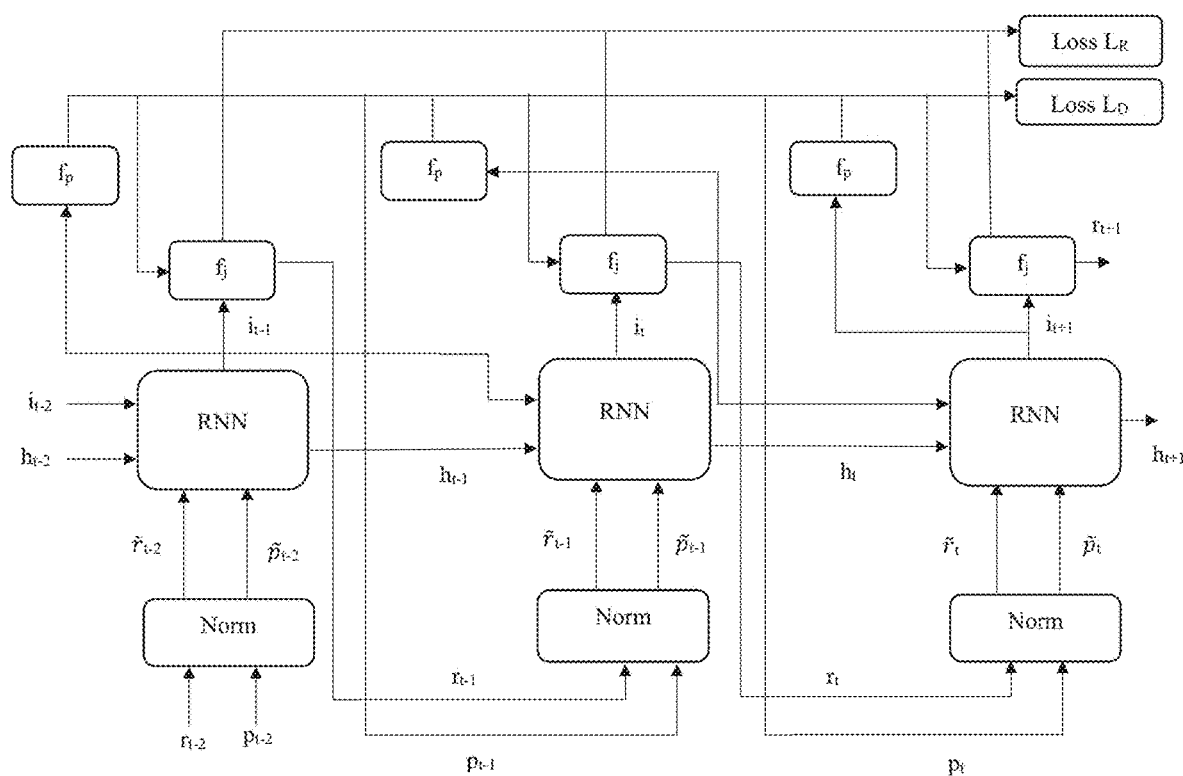
FIG. 3 is an exemplary block diagram illustrating a computation flow in RNN-Opt domain constraint according to embodiments of the present disclosure.

With reference to FIG. 3 is an exemplary block diagram illustrating a computation flow in RNN-Opt domain constraint according to embodiments of the present disclosure. Here $f_j$ is the function to be optimized, and $f_p$ is compute penalty $p_t$. Further, if $p_t=0$, actual value of $f_j$, i.e., $r_t$ is passed to the RNN, else $r_t$ is set to $r_{t-1}$.

For example, considering enhancements in RNN-opt in which input an explicit feedback $p_t$ via a penalty function, $p_t = f_p(i_t)$ to the RNN that captures the extent to which a proposed query $i_t$ violates any of the C domain constraints.

$$h_{t+1} = f_o(h_t, i_t, \widetilde{r_t}, \widetilde{p_t}; \theta) \qquad (2)$$

Further, whenever $p_t>0$, i.e., when one or more of the domain constraints are violated for the proposed query, by set $r_t$ is set to $r_{t-1}$ rather than actually getting $r_t$ from $f_j$.

During training, an additional domain constraint loss $L_D$ is considered that penalizes the neural network based optimizer if $i_t$ proposes a query that does not satisfy one or more of the domain constraints as in below equation (3)

$$L_D = \frac{1}{C} \sum_{f_j \in F} \sum_{t=2}^{T} p_t$$

The overall loss is then provided by as in below equation (4):

$$L = L_R + \lambda L_D$$

In an embodiment, apart from optimizing $f_j$, the neural network based optimizer is also simultaneously trained to minimize $f_p$.

The modified $i_t$, along with $e_t$ are passed to the multi-head output handler 212A to obtain $r_t$. In an embodiment, the multi-head output handler 212A comprises multiple processing heads, one per equipment instance. The processing head for the $j^{th}$ equipment instance is considered. In an embodiment, each processing head includes two components i.e., (i) a set of simulation models ($f_j$), and (ii) a reward function ($R_j$), both specific to the equipment instance. In an embodiment, the reward function ($R_j$) is used to compute a reward $r_t$ using $o_t$.

In an embodiment, values in the control parameter $i_t$ is clipped to satisfy domain constraints. In another embodiment, only those control parameter $i_t$ which satisfy domain constraints are passed to the Multi-Head Output Handler 212A.

In an embodiment, $i_t$ and $r_t$ are then fed back into the Neural Network based optimizer along with the vector of external input parameters at time 't+1', $e_{t+1}$ to obtain the set of control input parameters at time 't+1', $i_{t+1}$. In an embodiment, the equipment instance chosen for fine-tuning the pre-trained optimizer for a domain is changed periodically (after some constant iterations of training) in a round robin fashion so that the optimizer is trained on all the instances. In one embodiment, the loss function used for training the Neural Network based optimizer can be a regret-based loss function (as given by equation 1). Further, for domain constraint handling an additional loss function using the penalty values for violating domain constraints can be included to train the Neural Network based optimizer (as given by equation 3). In an embodiment, for an $(N+1)^{th}$ equipment instance, the Neural Network based optimizer can be fine-tuned using corresponding historical data, conditioned simulation model $f_{N+1}$ and corresponding reward function $R_{N+1}$.

With reference to FIG. 2B, in an embodiment, for testing, a trained Neural Network based optimizer is considered. The function $f_j$ is replaced by an actual equipment instance. For example, at any time 't', $i_{t-1}$, $r_{t-1}$ and $e_t$ are input to the Neural Network 204B to obtain the control parameter $i_t$. In an embodiment, control parameter $i_t$ is then modified by the domain constraints handler 206B. In one embodiment, a penalty term can be input to the optimizer and also values of the control parameter $i_t$ that violate domain constraints may not be passed through the equipment instance and be handled differently. The modified $i_t$ and $e_t$ are together input to an actual equipment 208B and output parameters, $o_t$, are collected and the reward $r_t$ is computed. In an embodiment, $i_t$, $r_t$ along with $e_{t+1}$ are then input to the Neural Network 204B to obtain $i_{t+1}$. This process is continued until a satisfactory result is obtained in terms of reward, output parameters or combination thereof.

In an exemplary embodiment, illustrating an application of the neural network based optimizer by considering a scenario of optimizing the operation of an aircraft engine during a single flight.

Considering, control input parameters ($i_t$: 3 dimensional):
a) Engine speed: Rotational speed of the engine—Allowed range: 5000 to 10000 RPM;
b) Fuel air ratio: Ratio of air mixed with fuel before burning—Allowed range: 0.05 to 0.20;
c) Bypass ratio: Ratio of air entering fan to air entering compressor—Allowed range: 0.25 to 0.45.

Considering, corresponding output variables ($o_t$: 2 dimensional):
a) Average aircraft speed: 900 to 1000 kmph (950 Ideal);
b) Fuel consumed: As low as possible.

Considering corresponding external input parameters variables ($e_t$: 2 dimensional):
a) Ambient air temperature at inlet of engine;
b) Ambient pressure at inlet of engine.

The neural network based optimizer is configured to learn to optimize for $i_t$ under the external conditions given by $e_t$ to meet a specific criterion defined by $o_t$. The allowed ranges for the control variables are used to define the domain constraints and a penalty function is used to obtain a penalty value in case of violations of the constraints when the neural network based optimizer suggests values for $i_t$.

Let us consider historical data for two aircraft engines E1 and E2 which have been operated for 50 flights each so that the data consists of 50 recorded values for the variables in $i_t$, $e_t$ and $o_t$. Using this data simulation models are learned for E1 and E2 that predict the values of $o_t$ using $i_t$ and $e_t$.

Also, the reward functions R1 and R2 can be defined using the output variables for E1 and E2 respectively. The simulation models together with the reward functions form the Multi-Head Output Handler. The sequence generator can be used to generate different sequences of $e_t$. The multi-head input handler is used to map the external variables to the input of the neural network.

Figure 4A:
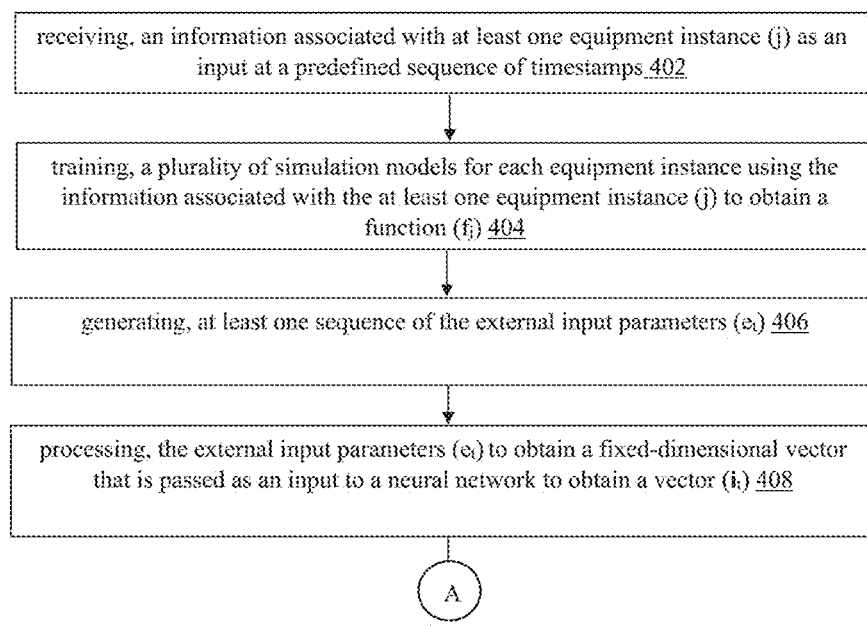
FIGS. 4A and 4B is an exemplary flow diagram illustrating a method of optimizing operation of an equipment by using the neural network based optimizer using the system of FIGS. 1, 2A and 2B, according to embodiments of the present disclosure.
Figure 4B:
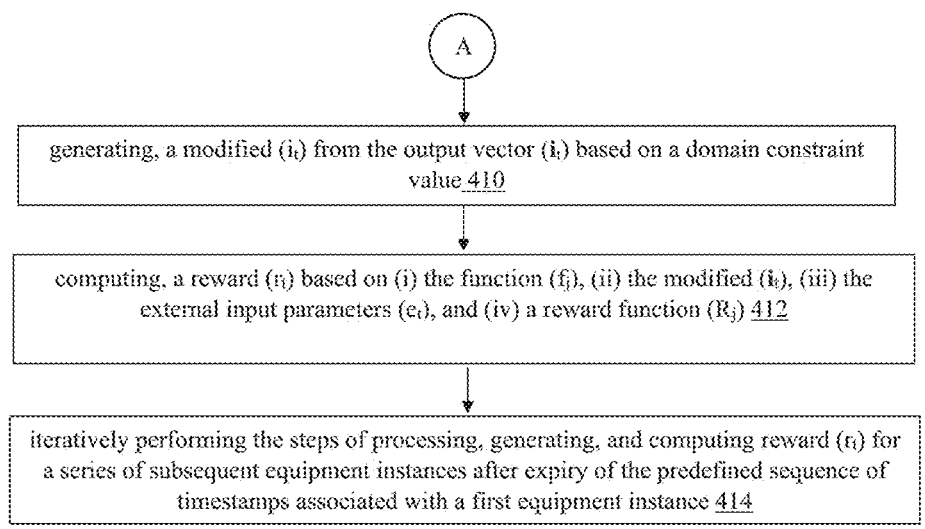

FIG. 4 is an exemplary flow diagram illustrating a method of optimizing operation of an equipment by using the neural network based optimizer using the system of FIGS. 1, 2A and 2B, according to embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system as depicted in FIGS. 1, 2A and 2B.

At step 402, information associated with at least one equipment instance (j) as an input at a predefined sequence of timestamps is received. In an embodiment, the information associated with the at least one equipment instance (j) corresponds to at least one of (i) a plurality of control parameters ($i_t$), (ii) external input parameters ($e_t$), (iii) output parameters ($o_t$), and (iv) historical operational data. At step 404, a plurality of simulation models for each equipment instance is trained by the simulation model trainer 202A using the information associated with the at least one equipment instance (j) to obtain a function ($f_j$). In an embodiment, the function ($f_j$) corresponds to a set of simulation models of the equipment instance (j). At step 406, at least one sequence of the external input parameters ($e_t$) is generated by the sequence generator 204A. At step 408, the external input parameters ($e_t$) is processed by, the multi-head input handler 206A to obtain a fixed-dimensional vector that is passed as an input to the neural network 208A to obtain an output vector ($i_t$). At step 410, a modified ($i_t$) from the output vector ($i_t$) based on a domain constraint value is generated by the domain constraints handler 210A. At step 412, a reward ($r_t$) is computed by the multi-head output handler 212A, based on (i) the function ($f_j$), (ii) the modified ($i_t$), (iii) the external input parameters ($e_t$), and (iv) a reward function ($R_j$). At step 414, the steps of processing, generating, and computing reward ($r_t$) is iteratively performed for a series of subsequent equipment instances after expiry of the predefined sequence of timestamps associated with a first equipment instance.

In an embodiment, the multi-head input handler includes a processing head for each equipment instance. In an embodiment, number of external input parameters differs across different instances of equipments. In an embodiment, the function $f_j$ is generated by at least one of (i) a Gaussian processes, or (ii) Gaussian mixture models constrained on dimensionality of the vector $i_t$ and the vector of external input parameters $e_t$, and combination thereof. In an embodiment, one or more hardware processors further configured to input, the vector ($i_t$) and reward ($r_t$) into the Neural Network with the vector of external input parameters at time ('t+1'), $e_{t+1}$ for iteratively performing the steps of process, generate, and compute reward to obtain the set of control input parameters at time (t+1), $i_{t+1}$. In an embodiment, dimensionality of $i_t$ and $e_t$ are determined by a target domain. In an embodiment, the step of training the neural network with a loss function is performed based on a maximum attainable value of the reward function ($R_j$). In an embodiment, the neural network is trained by including an additional loss function using a plurality of penalty values for violating domain constraints.

Experimental Results:

For example, for measuring performance of any optimizer after 't' iterations i.e., after proposing 't' queries, a regret given by $r_{opt}-\max_{i\le t} r_i$ is used. Lower values of regret indicate superior optimizer performance.

Figure 5A:
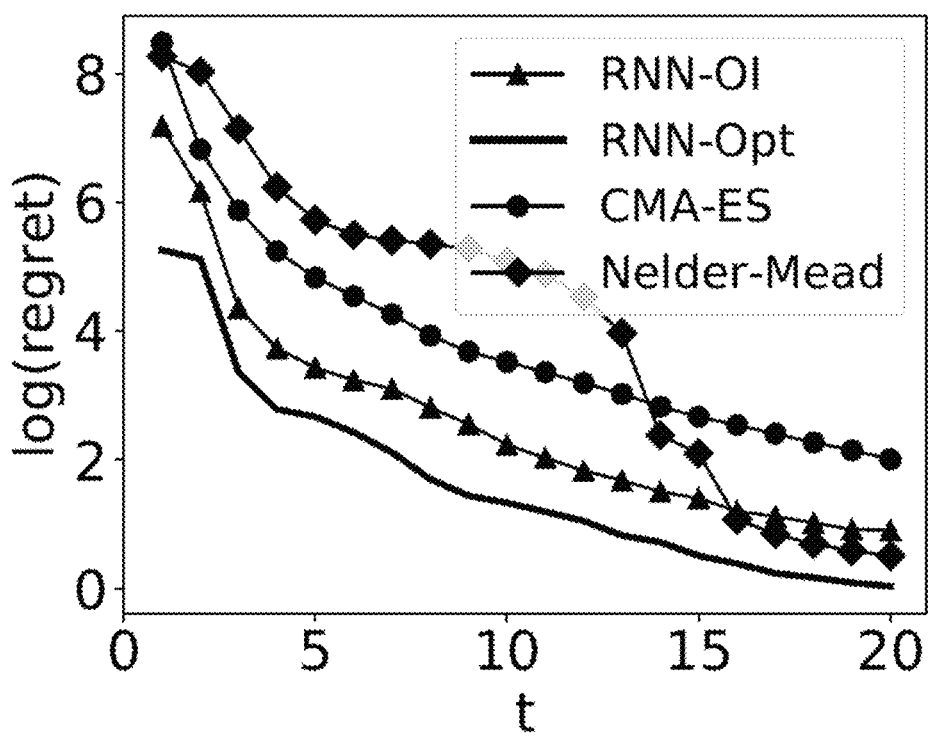
FIGS. 5A and 5B illustrates an exemplary graphical representation of result of optimization by a RNN-opt versus conventional optimization algorithms for benchmark functions, according to embodiments of the present disclosure.
Figure 5B:
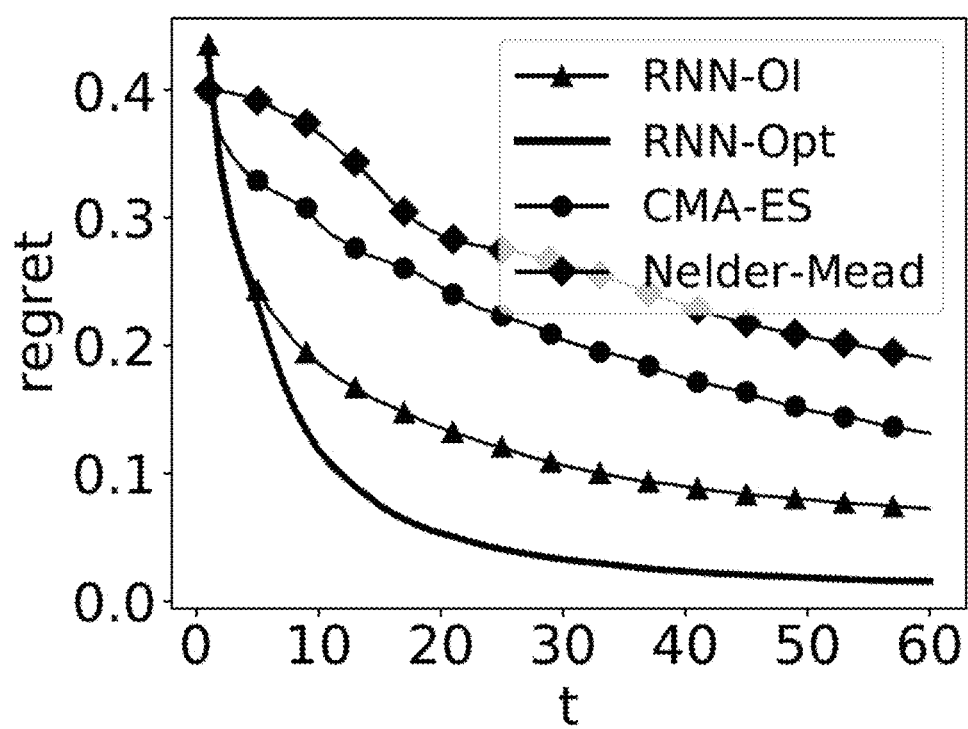

FIGS. 5A and 5B illustrates an exemplary graphical representation of result of optimization by RNN-opt versus conventional optimization algorithms for benchmark functions for d=2 and d=6, according to embodiments of the present disclosure. The RNN-Opt outperforms all the baselines considered on most functions considered while being at least as good as the baselines when compared to conventional optimization algorithms such as CMA-ES and Nelder-Mead.

Figure 6:
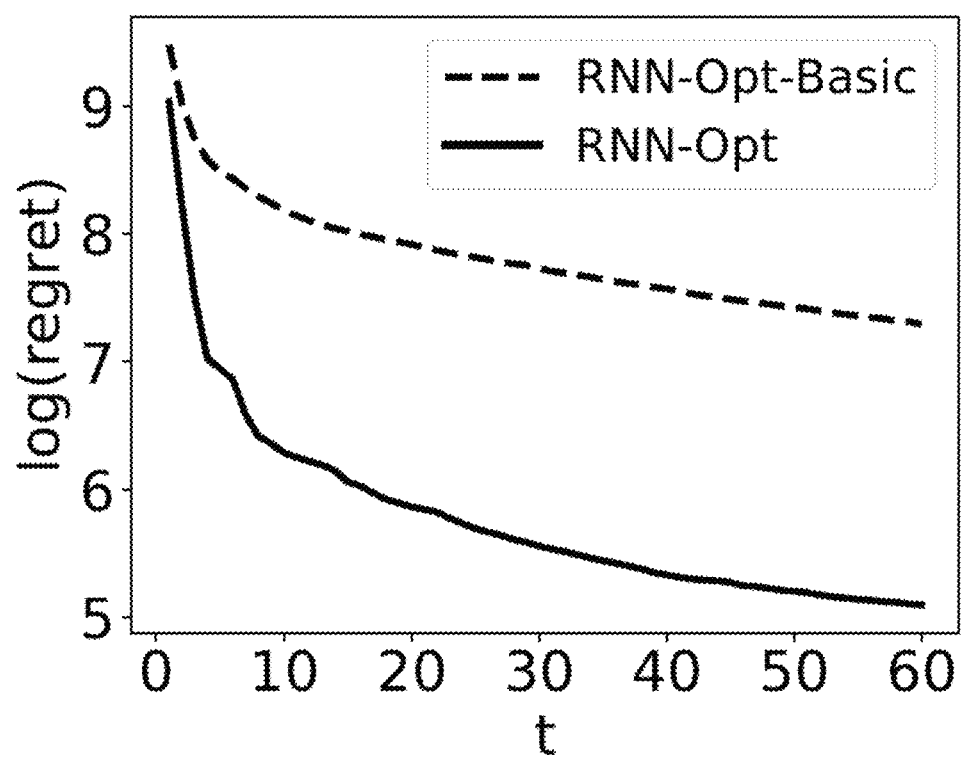
FIG. 6 illustrates an exemplary graphical representation of result as a regret plot showing effect of incremental normalization in RNN-Opt, according to embodiments of the present disclosure.

FIG. 6 illustrates an exemplary graphical representation of result as a regret plot showing effect of incremental normalization in RNN-Opt, according to embodiments of the present disclosure. Considering, incremental normalization during training and inference to optimize functions with diverse range of values. For example, RNN-Opt-Basic uses incremental normalization only during testing phase whereas RNN-Opt uses incremental normalization of inputs during training as well as testing phase.

Figure 7:
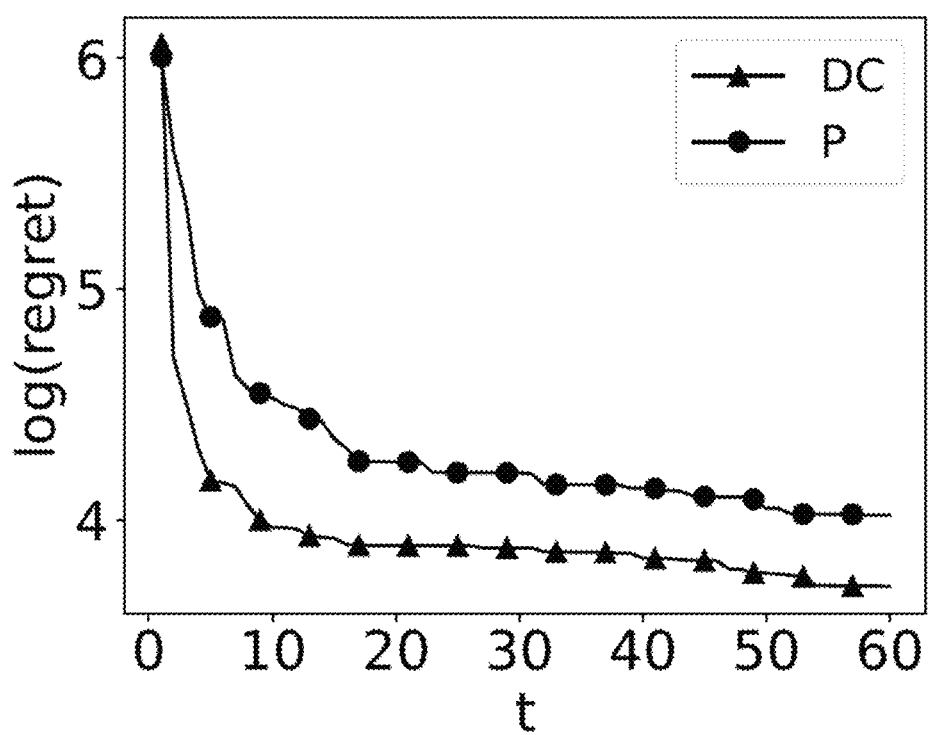
FIG. 7 illustrates an exemplary graphical representation of result as a regret plot comparing RNN-Opt-domain constraint and RNN-Opt-P, according to embodiments of the present disclosure.

FIG. 7 illustrates an exemplary graphical representation of result as a regret plot comparing RNN-Opt-domain constraint and RNN-Opt-P, according to embodiments of the present disclosure. Considering the RNN-Opt with minor variation during inference time (with no change in training procedure) where, instead of passing $\tilde{r}_t$ as input to the RNN, passing $\tilde{r}_t-\tilde{p}_t$ to capture penalty feedback is referred to as RNN-Opt-P. While RNN-Opt-Domain constraint is explicitly trained to minimize penalty $p_t$ explicitly, RNN-Opt-P captures requirement of trying to maximize $r_t$ under a soft-constraint of minimizing $p_t$ only during inference time. The RNN-Opt with domain constraints, namely, RNN-Opt-DC is able to effectively use explicit penalty feedback.

FIG. 8 is an exemplary table view with summary results of an operation optimization system for the equipment by using the neural network based optimizer according to embodiments of the present disclosure. The table provides the summary of results obtained by using one or more modes i.e., machine learning & domain based approach and the present approach automated neural network based optimizer. The machine learning & domain based approach results with a reward as 8.4 and are obtained in number of trails taken is 36. In contrary, with the claimed approach i.e., with the Neural Network based optimizer results with reward as 16.4 and are obtained in number of trails is 33.

In an embodiment, objective of the Neural Network optimizer is to output a vector of control parameters, $i_t$, at any trial 't' such that a reward $r_t$ is maximized (or minimized), or overall the number of trials is reduced. A method for training a neural network as an optimizer and then adapting for a target domain is proposed. Further, adapting the optimizer for a particular instance of the target domain is proposed. In one case, the neural network based optimizer is trained via meta-learning to solve the optimization problem on a large number of non-convex functions.

The Neural Network consider a control parameter vector $i_{t-1}$ and reward $r_{t-1}$ from time 't-1' as inputs along with a vector of external input parameters denoted by $e_t$, where dimensionality of $i_t$ and $e_t$ is determined by a target domain. The reward is calculated as a function (denoted by $R_j$) of the output parameter vector, or of the equipment. The function $f_j$, with inputs $i_t$ and $e_t$, computes $o_t$.

$$i_t = NN(i_{t-1}, r_{t-1}, e_t)$$

$$o_t = f_j(i_t, e_t)$$

$$r_t = R_j(o_t)$$

Here j=1, 2, . . . , N, where N is the number of equipment instances available for training.

The parameters given by $i_t$ can be an input to the equipment which can be controlled. The values taken by the parameters can also be constrained based on domain knowledge. The parameters in $e_t$ are external or non-controllable inputs, for example coal quality, ambient temperature, etc. The function $f_j$ can be generated from Gaussian processes which can, in some cases, be conditioned on the observed historical data. In other cases, the function $f_j$ can be a regression model trained on historical data via deep neural networks, linear regression models, etc. The function $f_j$ is approximated by simulation models of the $j^{th}$ equipment instance during training and during testing, is replaced by the actual physical equipment.

The embodiment of present disclosure herein addresses unresolved problem of number of trails required to obtain input parameter values. The embodiment thus provides an automated approach to obtain the optimal control input parameter values by using historical sensor data and previous optimization trials. Moreover, the embodiments herein further provide a solution can significantly reduce the number of trials required to obtain the optimal control input parameter values, and reduce time taken and costs involved for conducting such trials. Moreover, the embodiments herein further can obtain an optimizer that is general-purpose in the sense that once trained, it can be easily fine-tuned and used for obtaining optimal parameters of a new equipment. The embodiments of present disclosure can be extended for use to other domains as well. For example, where historical data can be used to build simulation models for processes/equipment, and this present method can then be used to optimize such processes.

The optimizer is trained to obtain optimal control input parameters on a large number of equipment simultaneously. The embodiment of present disclosure is generic in the sense that the number of external parameters across equipment need not be same. Further, once the neural network based optimizer is obtained, this approach allows to easily fine tune the optimization algorithm to perform better on the new equipment of interest. The embodiment of present disclosure is a data-driven approach that leverages sensor data from equipment to learn simulation models that are used for training the optimizer. Further, historical trials are leveraged to obtain new sequence of trials via the sequence generation module.

The embodiment of present disclosure leverages external input parameters that provide an estimate of the environmental operating conditions of an equipment, e.g., via various sensors installed on the equipment. Given the external input parameters which can vary over time, the optimal values for the control input parameters are estimated by the neural network based optimizer. These values are then tried by the technicians on the actual equipment and the reward in terms of output parameters is obtained. This reward and the most recent external input parameters are then used by the neural network based optimizer to recommend the next set of optimal values for the control input parameters.

The embodiment of present disclosure leverages the equipment operational data captured through various sensors to obtain simulation models and then use these models to learn data-driven optimization algorithms that can work across various models of the same equipment (e.g., different boiler types) or even across equipment types (e.g., across boilers and engines).

The neural network receives input via a multi-head input handler that allows to input varying number of external parameters depending on specific equipment instance useful to estimate operating conditions. Similarly, the neural network output is processed by a multi-head output handler that allows to use specific equipment instance simulation models. The core neural network based optimizer remains the same while it is trained simultaneously on various instances of same equipment with varying number of external parameters by changing the input and output heads.

The embodiment of present disclosure leverages various simulation models obtained from the historical sensor data to estimate the rewards during offline training of the neural network optimizer. These simulation models can be learned via machine learning and statistical models from the historical sensor data using neural networks, linear regression models, MARS, stepwise second order methods, etc.

The embodiment of present disclosure further simulates the sequence of trials by generating sequence of external input parameters for each equipment instance used for training the neural network based optimizer. The loss function used for training the neural network based optimizer is based on cumulative reward over trials. Therefore, present approach can be considered as learning an optimal policy in a reinforcement learning setting. The embodiments of present disclosure hypothesize that training an RNN optimizer using the loss function that minimizes regret observed for a given number of queries more closely resembles performance measures of an optimizer. The embodiments of present disclosure propose an incremental normalization that dynamically normalizes output from the function using one or more response values observed before passing as an input to the RNN optimizer. The embodiments of present disclosure overcome a problem of set of constraints in the input parameters by providing an additional feedback to the RNN optimizer while proposing a query that violates domain constraints.

At test time, the simulation models can be replaced by the actual equipment, and actual rewards can be computed by setting the equipment control input parameters to those given by the already trained neural network optimizer based on the current external input parameters. The reward can then be input back to the neural network to obtain the next control input parameter recommendation, and so on to eventually obtain an optimal value of control input parameter with desired behavior in terms of output parameters and reward.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method of optimizing an operation of an equipment by a neural network based optimizer, comprising:

receiving, information associated with at least one equipment instance (j) as an input at a predefined sequence of timestamps, wherein the information associated with the at least one equipment instance (j) corresponds to at least one of (i) a plurality of control parameters ($i_t$), (ii) external input parameters ($e_t$), (iii) output parameters ($o_t$), and (iv) historical operational data;

training, by a simulation model trainer, a plurality of simulation models for each equipment instance using the information associated with the at least one equipment instance (j) to obtain a function ($f_j$), wherein the function ($f_j$) corresponds to a set of simulation models of the equipment instance (j);

generating, by a sequence generator, at least one sequence of the external input parameters ($e_t$);

processing, by a multi-head input handler, the external input parameters ($e_t$) to obtain a fixed-dimensional vector that is passed as an input to a neural network to obtain an vector ($i_t$);

generating, by a domain constraints handler, a modified ($i_t$) from the output vector ($i_t$) based on a domain constraint value;

computing, by a multi-head output handler, a reward ($r_t$) based on (i) the function ($f_j$), (ii) the modified ($i_t$), (iii) the external input parameters ($e_t$), and (iv) a reward function ($R_j$); and iteratively performing the steps of processing, generating, and computing reward ($r_t$) for a series of subsequent equipment instances after expiry of the predefined sequence of timestamps associated with a first equipment instance.

2. The method as claimed in claim 1, wherein the multi-head input handler comprises a processing head for each equipment instance, wherein number of external input parameters differs across different instances of equipments.

3. The method as claimed in claim 1, wherein the function $f_j$ is generated by at least one of (i) a Gaussian processes, or (ii) Gaussian mixture models constrained on dimensionality of the output vector it and the vector of external input parameters $e_t$, and combination thereof.

4. The method as claimed in claim 1, further comprising, inputting, the output vector ($i_t$) and reward ($r_t$) into the Neural Network with the vector of external input parameters at time ('t+1'), $e_{t+1}$ for iteratively performing the steps of processing, generating, and computing reward to obtain the set of control input parameters at time (t+1), $i_{t+1}$, wherein dimensionality of $i_t$ and $e_t$ is determined by a target domain.

5. The method as claimed in claim 1, wherein the step of training the neural network with a loss function is performed based on a maximum attainable value of the reward function ($R_j$).

6. The method as claimed in claim 1, wherein the neural network is trained by including an additional loss function using a plurality of penalty values for violating domain constraints.

7. A system for operation optimization of an equipment by a neural network based optimizer, wherein the system comprising:
a memory storing instructions;
one or more communication interfaces; and
one or more hardware processors coupled to the memory via the one or more communication interfaces, wherein the one or more hardware processors are configured by the instructions to:
receive, information associated with at least one equipment instance (j) as an input at a predefined sequence of timestamps, wherein the information associated with the at least one equipment instance (j) corresponds to at least one of (i) a plurality of control parameters ($i_t$), (ii) external input parameters ($e_t$), (iii) output parameters ($o_t$), and (iv) historical operational data;
train, a plurality of simulation models for each equipment instance using the information associated with the at least one equipment instance (j) to obtain a function ($f_j$), wherein the function ($f_j$) corresponds to a set of simulation models of the equipment instance (j);
generate, at least one sequence of the external input parameters ($e_t$);
process, the external input parameters ($e_t$) to obtain a fixed-dimensional vector that is passed as an input to a neural network to obtain an output vector ($i_t$);
generate, a modified ($i_t$) from the output vector ($i_t$) based on a domain constraint value;
compute, a reward ($r_t$) based on (i) the function ($f_j$), (ii) the modified ($i_t$), (iii) the external input parameters ($e_t$), and (iv) a reward function ($R_j$); and
iteratively perform the steps of process, generate, and compute reward ($r_t$) for a series of subsequent equipment instances after expiry of the predefined sequence of timestamps associated with a first equipment instance.

8. The system as claimed in claim 7, wherein a multi-head input handler comprises a processing head for each equipment instance, wherein number of external input parameters differs across different instances of equipments.

9. The system as claimed in claim 7, wherein the function $f_j$ is generated by at least one of (i) a Gaussian processes, or (ii) Gaussian mixture models constrained on dimensionality of the output vector it and the vector of external input parameters $e_t$, and combination thereof.

10. The system as claimed in claim 7, wherein the one or more hardware processors are further configured by the instructions to input, the output vector ($i_t$) and reward ($r_t$) into the Neural Network with the vector of external input parameters at time ('t+1'), $e_{t+1}$ to iteratively perform the steps of process, generate, and compute reward ($r_t$) to obtain the set of control input parameters at time (t+1), $i_{t+1}$, wherein dimensionality of $i_t$ and $e_t$ is determined by a target domain.

11. The system as claimed in claim 7, wherein the step of training the neural network with a loss function is performed based on a maximum attainable value of the reward function ($R_j$).

12. The system as claimed in claim 7, wherein the neural network (208A) is trained by including an additional loss function using a plurality of penalty values for violating domain constraints.

13. One or more non-transitory machine readable information storage mediums comprising one or more instructions which when executed by one or more hardware processors causes:
receiving, information associated with at least one equipment instance (j) as an input at a predefined sequence of timestamps, wherein the information associated with the at least one equipment instance (j) corresponds to at least one of (i) a plurality of control parameters ($i_t$), (ii) external input parameters ($e_t$), (iii) output parameters ($o_t$), and (iv) historical operational data;
training, a plurality of simulation models for each equipment instance using the information associated with the at least one equipment instance (j) to obtain a function ($f_j$), wherein the function ($f_j$) corresponds to a set of simulation models of the equipment instance (j);
generating, at least one sequence of the external input parameters ($e_t$);
processing, the external input parameters ($e_t$) to obtain a fixed-dimensional vector that is passed as an input to a neural network to obtain an vector ($i_t$);
generating, a modified ($i_t$) from the output vector ($i_t$) based on a domain constraint value;
computing, a reward ($r_t$) based on (i) the function ($f_j$), (ii) the modified ($i_t$), (iii) the external input parameters ($e_t$), and (iv) a reward function ($R_j$); and
iteratively performing the steps of processing, generating, and computing reward ($r_t$) for a series of subsequent equipment instances after expiry of the predefined sequence of timestamps associated with a first equipment instance.

14. The one or more non-transitory machine-readable information storage mediums as claimed in claim 13, wherein the multi-head input handler comprises a processing head for each equipment instance, wherein number of external input parameters differs across different instances of equipments.

15. The one or more non-transitory machine readable information storage mediums as claimed in claim 13, wherein the function $f_j$ is generated by at least one of (i) a Gaussian processes, or (ii) Gaussian mixture models constrained on dimensionality of the output vector it and the vector of external input parameters $e_t$, and combination thereof.

16. The one or more non-transitory machine readable information storage mediums as claimed in claim 13, wherein the one or more hardware processors are further configured by the instructions for inputting, the output vector ($i_t$) and reward ($r_t$) into the Neural Network with the vector of external input parameters at time ('t+1'), $e_{t+1}$ for iteratively performing the steps of processing, generating, and computing reward to obtain the set of control input parameters at time (t+1), $i_{t+1}$, wherein dimensionality of $i_t$ and $e_t$ is determined by a target domain.

17. The one or more non-transitory machine readable information storage mediums as claimed in claim 13, wherein the step of training the neural network with a loss function is performed based on a maximum attainable value of the reward function ($R_j$).

18. The one or more non-transitory machine readable information storage mediums as claimed in claim 13, wherein the neural network is trained by including an additional loss function using a plurality of penalty values for violating domain constraints.

* * * * *